Jan. 19, 1926.
M. P. HOLMES
CHAIN
Filed June 13, 1921
1,570,440
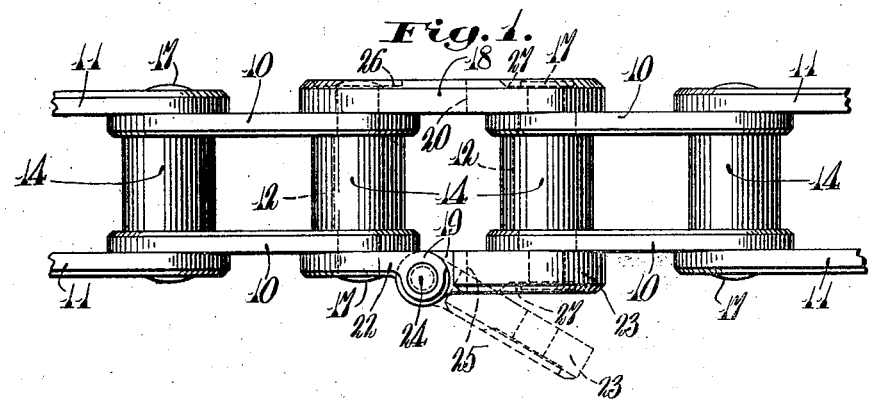
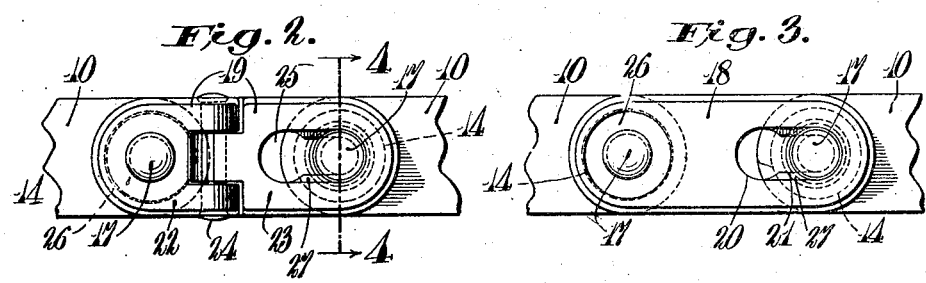
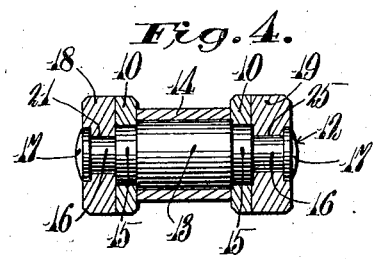
Inventor:
Morris P. Holmes Patented Jan. 19, 1926.

1,570,440

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

CHAIN.

Application filed June 13, 1921. Serial No. 477,044.

*To all whom it may concern:*

Be it known that I, MORRIS P. HOLMES, a citizen of the United States, residing at Claremont, in the county of Sullivan and State of New Hampshire, have invented certain new and useful Improvements in Chains, of which the following is a full, clear, and exact specification.

This invention relates to drive or sprocket chains of the type comprising pairs of links connected by hinge pins, and has for its object to provide simple and effective means for forming a detachable joint in such a chain, said means being of a substantial character and being so constructed and arranged as to permit adjacent chain sections to be easily and quickly detached or attached, while operating securely to retain the parts in connected condition without danger of accidental disengagement.

The foregoing and other objects of the invention, together with means whereby the same may be carried into effect, will best be understood from the following description of one form or embodiment thereof illustrated in the accompanying drawings, in which:

Fig. 1 is a plan view of a section of chain provided with a detachable joint constructed in accordance with the invention.

Figs. 2 and 3 are side views, looking respectively from the bottom and from the top in Fig. 1, of the detachable joint.

Fig. 4 is a section on the line 4—4 of Fig. 2.

The chain shown in the drawings comprises a series of pairs of inner links 10 and a series of pairs of outer links 11, said inner and outer links having overlapping end portions connected by hinge pins 12. Each of said hinge pins comprises a central portion 13 (Fig. 4) interposed between the inner links 10 and provided, if desired, with an anti-friction roller 14 for engagement with the teeth of the sprocket with which the chain cooperates; intermediate portions 15 adjacent the central portion 13, and of slightly less diameter, which are received in openings in the inner links 10; and end portions 16 immediately adjacent the intermediate portions 15, and of less diameter than the latter portions, which are received in openings in the outer links 11, said links being retained on said pin portions by heads 17 formed on the ends of the pin. The portions 13, 15, and 16 of the pins 12 are all of circular cross-section, thereby providing for the free turning movement of all of the parts engaging said pins, while the direct engagement of the links 10 and 11 with the immediately adjacent portions 15 and 16 of said pins provides an efficient construction employing a minimum number of relatively simple parts.

In order to provide a detachable connection between two of the hinge pins 12, said pins are connected by special outer or side links 18 and 19 which replace one pair of outer links 11. The link 18 is a solid link permanently connected at one end with one of the pins 12 in a manner substantially similar to the connection of the links 11. At its opposite end the link 18 is formed with a keyhole slot having a relatively wide portion 20 of a diameter substantially equal to the diameter of the head 17 of the adjacent pin and adapted to receive the same, and a relatively narrow portion 21 of a width substantially equal to the diameter of the portion 16 of the adjacent pin and adapted to receive the latter. The link 19 is formed in two parts 22 and 23, the former being permanently connected with the adjacent pin 12 in the same maner as the links 11. The part 23 is connected to the part 22 by a hinge pin 24, disposed with its axis transverse to the axis of the pins 12, and about which hinge pin said part 23 is free to move or swing laterally toward and away from the pin 12 with which it connects, said part 23 being formed with a keyhole slot 25 substantially similar to the keyhole slot 20, 21 in the link 18. The link 18 and the portion 23 of the link 19 are preferably made slightly thicker or heavier than the links 11 and are recessed at 27 adjacent the narrower portions of the keyhole slots therein to receive the heads 17 of the pin 12 which engages said slots, and the opposite end of the link 18 being further recessed at 26 to receive the head of the next adjacent pin with which it is connected.

The narrower portions of the keyhole slots are toward the outer ends of the latter, and the normal tension on the chain tends to hold the pins in these narrower portions of the slots, thereby securely retaining the parts against accidental disengagement. In order to disconnect the parts, the hinge pins 12 connected by the links 18, 19 are moved toward one another, thereby carrying the portions 16 of the corresponding pin 12 into the wider portions of the keyhole slots in said links, whereupon the portion 23 of the link 19 may be swung outwardly upon the hinge pin 24, as shown in dotted lines in Fig. 1, thereby disengaging the same from its hinge pin 12, which may thereupon be moved laterally to disengage the same from the link 18, thus completely disconnecting the joint.

From the foregoing it will be seen that I have provided an extremely simple but effective detachable connection for drive chains of the character referred to which may be easily and quickly operated to connect or disconnect the parts, which will securely retain the parts against accidental disconnection, which is fully as strong as the remaining portions of the chain or chains, and the use of which in nowise impairs the flexibility of the latter.

It will be noted that, in place of the solid, laterally fixed link 18, a second two-part link similar to the link 19 may, if preferred, be employed, thereby permitting connection and disconnection of the joint without any lateral movement whatever of either hinge pin 12.

While I have in this specification shown and described in detail one embodiment which my invention may assume in practice, it is to be understood that the particular construction described and shown has been chosen for illustrative purposes merely, and that the invention may be otherwise embodied and practiced without departing from its spirit or the scope of the claims hereunto appended.

What I claim as new and desire to secure by Letters Patent is:—

1. In a drive chain comprising links and hinge pins connecting said links, a link having permanent connection with one of said hinge pins and laterally movable with respect to said pin into and out of engagement with the next adjacent pin.

2. In a drive chain comprising links and hinge pins connecting said links, a link having permanent connection with one of said hinge pins and constituting the sole connecting means at one side of said chain and laterally movable into and out of engagement with the next adjacent hinge pin while both of said hinge pins remain stationary.

3. In a drive chain comprising side links and hinge pins connecting said links, a laterally angularly movable side link constituting the sole connection means at one side of the chain.

4. In a drive chain comprising links and hinge pins connecting said links, a link connected with one of said pins and mounted to swing about an axis transverse to said hinge pin into and out of engagement with the next adjacent pin.

5. In a drive chain comprising links and hinge pins connecting said links, a link having a fixed portion connected to one of said hinge pins and a relatively movable portion having detachable connection with the next adjacent hinge pin.

6. In a drive chain comprising links and hinge pins connecting said links, a link having a fixed portion connected to one of said hinge pins and a portion connected with said fixed portion to swing about an axis transverse to said hinge pin into and out of engagement with the next adjacent hinge pin.

7. A drive chain comprising pairs of links and hinge pins connecting said links, one of the links of one of said pairs being laterally fixed with respect to one of the pins which it connects and the other link of said pair being laterally movable about a pivot into and out of engagement with the other of said pins.

8. A drive chain comprising pairs of links and hinge pins connecting said links, one of the links of one of said pairs being solid, and the other link of said pair comprising two relatively movable tension portions, one of which is adapted for detachable engagement with one of the pins connected thereby.

9. In a drive chain comprising links and hinge pins connecting said links, a link having permanent connection with one of said pins and having a portion thereof movable with respect thereto other than about the axis thereof, said portion having a keyhole slot, and the next adjacent pin having a headed end adapted for detachable engagement with said slot.

10. A drive chain comprising links and hinge pins connecting said links, said pins having adjacent portions directly engaged by overlapping portions of adjacent links, one of said links having a laterally hinged portion provided with a keyhole slot, and one of said pins having a headed end cooperating with said slot.

11. A drive chain comprising links and hinge pins connecting said links, said pins having adjacent portions directly engaged by overlapping portions of adjacent links, the links connecting a certain pair of said pins each having portions provided with keyhole slots and one of said pins having heads at its ends cooperating with slots, and means permitting relative movement between said slotted portions in a plane including the axis of the other of said pair of pins, whereby the first pin may be positioned for engagement in said keyhole slots while the other ends of said links are connected.

12. A drive chain made up of links and hinge pins connecting said links and means for joining the ends of said chain to form a closed circuit comprising a pin at one end of said chain and links inseparably connected at one end to a pin adjacent the other end of said chain, and means for permitting relative movement between the free ends of said last mentioned links in the plane of said pins.

13. A drive chain made up of links and hinge pins connecting said links, and means for joining the ends of said chain to form a closed circuit comprising a pin at one end of said chain and links inseparably connected at one end to a pin adjacent the other end of said chain, the free ends of said last mentioned links being each provided with a keyhole slot, and means permitting lateral relative movement between said last mentioned links.

14. In a drive chain comprising links and hinge pins connecting said links, a pair of detachable side links inseparably connected to one of said hinge pins and each having slotted portions movable relative to another, one of said links including a plurality of pivotally connected portions.

15. In a drive chain comprising links and hinge pins connecting said links, a detachable side link inseparably connected to one of said pins and detachable relative to another, and a detachable two-part side link inseparably connected to one of said pins and having a slotted detachable portion movable laterally relative to another.

16. A drive chain comprising side links and hinge pins connecting said links, means permitting moving one of said pins in parallel relation relative to another, and means permitting lateral angular movement of one of said side links relative to one of said pins.

In testimony whereof I affix my signature.

MORRIS P. HOLMES.